United States Patent [19]
Rothschild et al.
[11] 3,758,730
[45] Sept. 11, 1973

[54] MULTI-CHANNEL CASSETTE SYSTEM FOR SOUND RECORDING AND REPRODUCTION WITH INTERLOCKED STACKED CASSETTES

[76] Inventors: Kenneth J. Rothschild, 44 Hooker St., Allston, Mass. 02134; Leigh M. Rothschild, 764 Mahooney Hall, Coral Gables, Fla. 33146

[22] Filed: Mar. 15, 1972

[21] Appl. No.: 234,841

[52] U.S. Cl. ...... 179/100.2 Z, 242/55.19 A, 274/4 F
[51] Int. Cl. ........................................... G11b 23/04
[58] Field of Search ........... 179/100.2 Z, 100.2 MD, 179/100.2 E; 274/4 G, 4 C, 4 E, 4 F; 242/55.19 A

[56] References Cited
UNITED STATES PATENTS

| | | | |
|---|---|---|---|
| 3,534,178 | 10/1970 | Weigel et al. | 274/4 F |
| 3,083,269 | 3/1963 | Gaubert | 242/55.19 A |
| 3,582,949 | 6/1971 | Frost | 179/100.2 MD |
| 3,511,940 | 5/1970 | Lemelson | 274/4 F |

*Primary Examiner*—Bernard Konick
*Assistant Examiner*—Alfred H. Eddleman
*Attorney*—John B. Pegram and Harold E. Drumm et al.

[57] ABSTRACT

A cassette system including first and second cassettes arranged in a stacked relationship, first removable means for interlocking aligned supply reels, second removable means for interlocking aligned take-up reels, rotatable spindle means for receiving the aligned and interlocked supply reels and take-up reels, magnetic transducer means for reproducing or recording information on the magnetic tapes of the cassettes, and means for driving the magnetic tapes of the cassettes past the magnetic transducer means. Advantageously, the spindle means may also be utilized with stacked cassettes which are not interlocked.

4 Claims, 6 Drawing Figures

MULTI-CHANNEL CASSETTE SYSTEM FOR SOUND RECORDING AND REPRODUCTION WITH INTERLOCKED STACKED CASSETTES

The present invention relates to sound recording and reproduction, and more specifically to a multi-channel cassette system for sound recording and reproduction.

Within the last few years cassettes have had an increasingly greater impact on the sound recording and reproduction industry. It has been predicted by people knowledgeable in this field that the cassette may ultimately replace the disc or record as the number one selling sound reproduction medium.

Standard cassettes which are presently available perform quite adequately when recording or reproducing two channel sound (conventional stereo) and are compatible with monaural equipment. However, it is the desire of the cassette industry to provide practical cassette system for multi-channel (four channel) recording and reproduction which is fully compatible with standard cassettes.

Four channel or quadraphonic sound recording and reproduction is the present goal of the cassette industry. In an effort to provide four channel cassettes various proposals have been suggested, such as decreasing channel width and therefore modifying the magnetic heads of the recording and reproduction machine. These proposals result in a change in the magnetic heads, or a loss of fidelity, or loss of playing time per unit and are therefore unacceptable to the cassette industry.

To provide true quadrophonic sound, discrete sound is recorded from left front, right front, left rear, and right rear microphones on four discrete channels. To provide the illusion of quadraphonic sound the sound industry has employed matrixing and other techniques.

It is an object of the present invention to provide a discrete multi-channel cassette system for sound recording and reproduction.

It is a further object of the present invention to provide a multi-channel cassette system for sound recording and reproduction which utilizes standard cassettes and possesses maximum compatibility.

It is a further object of the present invention to provide a multi-channel cassette system which provides quadrophonic sound.

It is a further object of the present invention to provide a cassette package and means for readily converting standard cassettes into a cassette package for multi-channel recording and reproduction.

It is a further object of the present invention to provide a cassette recording and reproduction machine for the cassette package of the present invention which is fully compatible with conventional cassettes.

It is a further object of the present invention to provide a cassette recording and reproduction machine having a novel spindle and head construction for sound recording and reproduction which can be used with stacked interlocked or uninterlocked cassettes, or a single cassette.

It is a further object of the present invention to provide a method of making a cassette package which provides discrete four channel sound reproduction.

Other objects, aspects and advantages of the present invention will be more apparent when the detailed description is considered with drawing as follows.

Figure 1:
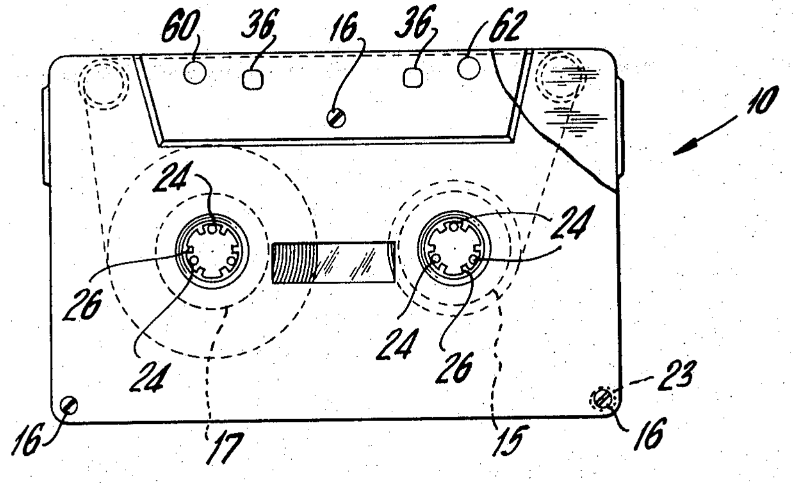
FIG. 1 is a top plan view of an illustrative embodiment of an assembled cassette package of the present invention.
Figure 2:
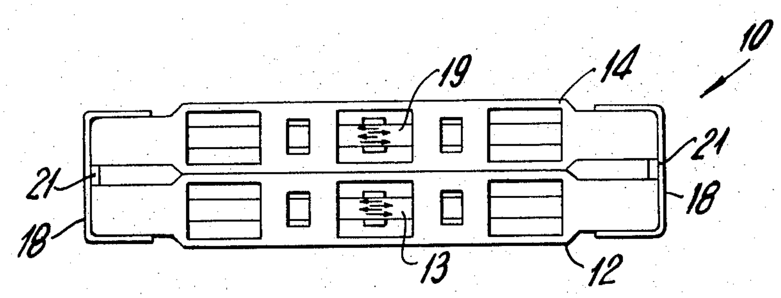
FIG. 2 is a side view in elevation of the assembled stacked cassette package of FIG. 1, showing alternate fastening means.

Referring to FIGS. 1 and 2, an assembled cassette package 10 according to the present invention is illustrated. The cassette package 10 includes a first conventional cassette 12 having a supply reel and take-up reel (not shown), and magnetic tape 13, and a second conventional cassette 14 having a supply reel 15, take-up reel 17, and magnetic tape 19. The second cassette 14 is placed upon the first cassette 12 so that their supply reels and take-up reels are respectively axially aligned. Fastening means, shown as bolts 16 in FIG. 1 with concentric spacers (not shown) placed between the cassettes 12 and 14 or U-shaped clamps 18 with intermediate spacer portions 21 as shown in FIG. 2, may be used to maintain the cassettes 12 and 14 in their aligned or stacked position. If bolts 16 are employed aligned tapped holes 23 are positioned in the cassettes 12 and 14 to receive the bolts 16 as seen in FIG. 1.

Figure 3:
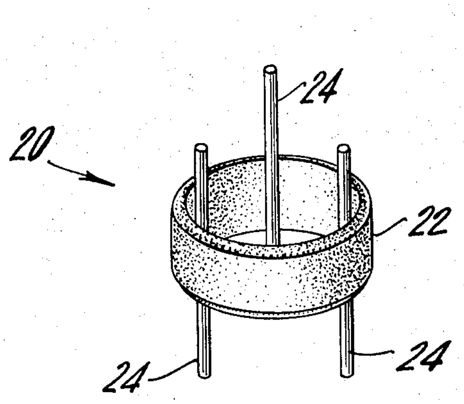
FIG. 3 is a perspective view of an illustrative embodiment of the reel interlocking means for interlocking and synchronizing the movement of the aligned cassette reels.

The aligned supply reels and aligned take-up reels may be interconnected for synchronous movement by a pair of identical removable reel interlocking means 20, shown in FIG. 3. The reel interlocking means 20 includes a central seating ring 22 with three spaced transverse pins 24 arranged equidistant therearound. Preferably, the pins 24 are connected to the interior of the ring 22 and the length of the ring 22 is approximately equal to the exposed length of the pins 24 extending above the ring 22 and also approximately equal to the exposed length of the pins 24 extending below the ring 22. The central seating ring 22 may advantageously be made of rubber and the pins 24 of metal; further, the pins 24 are rigidly connected to the seating ring 22 with any suitable adhesive, e.g., epoxy. Alternatively, the removable reel interlocking means 20 may be formed entirely of molded plastic as desired. The pins 24 may also be shaped to provide resistance to separation of the cassettes 12 and 14 once interlocked, e.g., they may be bent outwardly to provide an interference fit against the hubs of the reels.

The central seating rings 22 of the interlocking means 20 is sized, and may be beveled, for positioning against the hubs in the ring seat formed by mating the countersunk recesses at the periphery of reel openings when the cassettes 12 and 14 are stacked one on top of the other. The three transverse pins 24 extend upwardly and downwardly therefrom from the central rings 22 and are positioned between every other adjacent pair of sprockets 26 of the aligned supply and take-up reels, as shown in FIG. 1. Thus, the pair of aligned supply reels and the pair of aligned take-up reels are interconnected through the interlocking means 20 for synchronous movement. (Typically each reel includes six sprockets 26 and the three skipped pairs of sprockets 26 will receive the spindle collar ribs as described in more detail below.)

In using the cassette system of the present invention, it is advantageous to record or reproduce two axially aligned cassettes without having the take-up reels and supply reels interlocked by the interlocking means 20 previously described. When the cassette system is employed in this way, synchronous movement of the magnetic tapes past the magnetic transducers, and the supply and take-up of the magnetic tapes is provided by the spindle means as described below.

Figures 4, 5, 6:
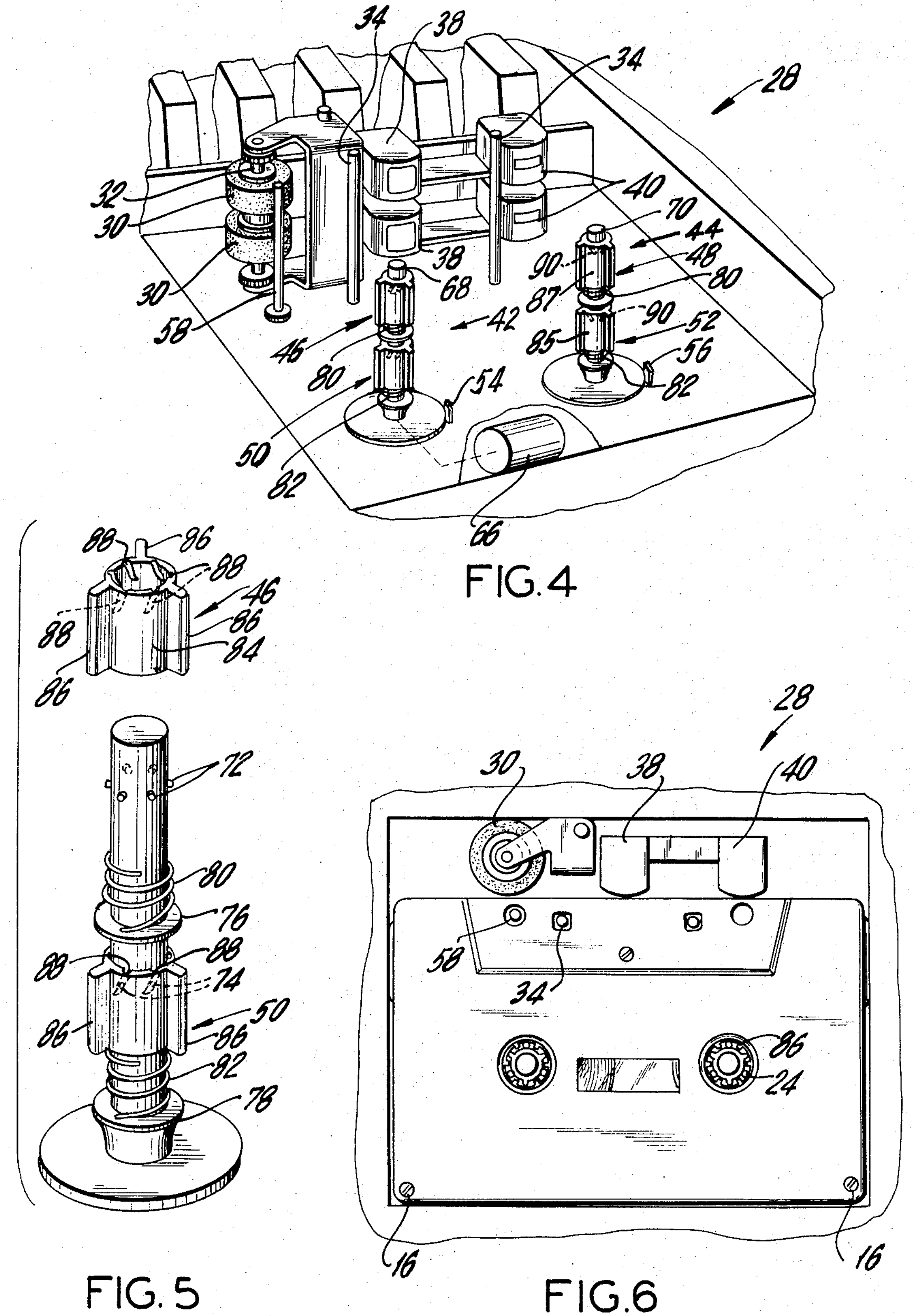
FIG. 4 is a perspective view of an illustrative embodiment of a sound recording and reproduction machine according to the present invention.
FIG. 5 is an enlarged view of one of the spindles and associated collars of the sound recording and reproduction machine.
FIG. 6 is a top plan view of the cassette package shown in FIGS. 1 and 2 inserted in the recording and reproduction machine of FIG. 4 and ready for use.

Referring to FIG. 4, the sound recording and reproduction machine 28 employed with the cassette package 10 of the present invention is shown. The machine 28 includes a pair of rotatable pressure rollers 30 concentrically mounted on roller shaft 32, a pair of positioning bars 34 for insertion into aligned holes 36 in the stacked cassette package 10, a pair of vertically aligned magnetic transducer recording and reproduction heads 38, a pair of vertically aligned magnetic transducer erase heads 40, a pair of spindle means 42 and 44, each having upper collars 46 and 48 and lower collars 50 and 52, respectively, spindle means locks 54 and 56, and a tape drive shaft or capstan 58 for insertion into aligned holes 60 or 62 in the stacked cassette package 10.

The cassette package 10 is inserted in the machine 28 by mounting the reels on the spindle means 42 and 44, placing positioning bars 34 in the holes 36 and capstan 58 in hole 60. The recording heads 38 and erasing head 40 and pressure rollers 30 are inserted in their respective openings in the cassette 12 and 14 by effecting relative movement therebetween, e.g., by using the structure as disclosed in U.S. Pat. No. 3,394,899, issued to J. J. M. Schoenmakers, herein incorporated by reference.

Sound from a left front microphone may be recorded on the first and fourth tracks of the first cassette 12, and sound from a right front microphone may be recorded on the second and third tracks of the first cassette 12. Sound from a left rear microphone may be recorded on the first and fourth tracks of the second cassette 14, and sound from a right rear microphone may be recorded on the second and third tracks of the second cassette. When such a pre-recorded cassette package is positioned in the cassette machine 28 and the machine 28 operated in the play mode, discrete four channel quadraphonic sound results; the effect is similar to the sound heard when one is seated in a concert hall, since discrete sound is eminating from four channels. Only four tracks of the eight tracks of the synchronized magnetic tapes are used during movement of the tapes in one direction, so that the remaining four tracks provide a "second side" for recording and reproduction similar to that of a conventional two channel or four track cassette. The track arrangements for recording quadraphonic sound are numerous and other track arrangements may be utilized with the cassette system of the present invention.

Referring particularly to FIG. 4 and 5, spindle means 42 and 44 include spindles 68 and 70. Each spindle 68 and 70 includes a set of upper protuberances or pins 72 and a set of lower protuberances or pins 74 extending transversively outward therefrom. Six pins are included in each set of pins and all the pins of each set lie within a plane transverse to the spindles 68 and 70. Further, the pins 72 and 74 of each set are equally spaced around the spindles 68 and 70.

The upper and lower collars 46, 48 and 50, 52 respectively, are rotatably mounted on the spindles 42 and 44 below their respective sets of pins. The spindles 42 and 44 also include upper and lower radially extending flanges 76 and 78 positioned below the sets of pins which limit the downward movement of the collars 46, 48 and 50, 52. Upper and lower biasing springs 80 and 82 contact the flanges 76 and 78 and the collars 46, 48 and 50, 52, respectively, and bias the collars upwardly toward the sets of pins.

Collar 46 (collar 50 is identical) has a cylindrical sleeve 84 with three equidistant ribs 86 extending longitudinally along the peripheral surface thereof. Between each pair of adjacent ribs 86 is a pair of receiving grooves 88 arranged in the interior surface of the sleeve 84, and which extend acutely downward from the upper end of the sleeves 84. Each receiving groove 88 is spaced approximately 60° apart. Further, each receiving groove 88 extends for approximately 60° to provide a 60° rotation of the engaged collar when the pins are in the receiving grooves.

Collars 48 and 52 are identical to collars 46 and 50 except that the receiving grooves 90 extend downwardly from the upper end of the sleeves 85 and 87 at an acute angle opposite in direction to the angle of grooves 88. Thus, one set of collars 46, 50 is arranged for engagement with the pins 72 and 74 when the collars 46, 50 are rotated counterclockwise and the other set of collars 48, 52 is arranged for engagement with the pins 72 and 74 when the collars 48, 52 are rotated clockwise.

Depending upon the mode of operation of the machine 28 one of the spindles 68 and 70 is mechanically linked to a motor 66. In play-record mode spindle 68 is engaged to motor 66. In the rewind mode spindle 70 is engaged to motor 66. When the spindles are motor driven, the collars may turn at a variable rate consistent with the rate at which magnetic tape is being fed out by the capstan 58 (driven in a conventional manner) during the cassette recording and reproduction. The spindles 68 and 70 turn at a constant angular speed, while the collars turn at a variable angular speed. Locking pads 54 and 56 are used to engage the base of the spindle 68 or 70 which is not motor driven to prevent rotation thereof.

With the above described spindle and collar construction according to the present invention the cassette system operates as follows:

In the play-record mode the take-up spindle means 42 is driven counterclockwise by motor 66 at a constant rate. Due to biasing springs 80 and 82, and due to frictional coupling between collars 46 and 50 with spindle 68, there is a tendency for the grooves 88 in collars 46 and 50 to remain in engagement with pins 72 and 74 and to rotate counterclockwise with spindle 68. However, tape 13 and 19 is being fed out by capstan 58 at a rate which causes collars 46 and 50 to turn at a lesser angular speed than that of spindle 68. This results in relative movement of the collars 46 and 50, and associated grooves 88, clockwise in relation to spindle 68 and thus causes the pins 72 and 74 to partially disengage from the grooves 88. Thus, the collars 46 and 50 will rotate counterclockwise, but only at an angular rate controlled by the rate at which the tape 13 and 19 is being fed from capstan 58. Additionally, during the play-record mode, spindle means 44 is locked by locking pad 56. Counterclockwise rotation of grooves 90 in collars 48 and 52 due to takeup of tape 13 and 19 by capstan 58 causes full disengagement of grooves 90 from pins 72 and 74 allowing free and independent rotation of the collars 48 and 52 about the spindle 70.

During the fast forward mode, there is no limiting tape feedout by capstan 58 since the pinch rollers 30 are disengaged, and thus grooves 88 of collars 46 and 50 will remain fully engaged. Otherwise, the spindle means 42 and 44 and the associated collars operate identically in the fast forward mode as they do in the play-record mode.

In the rewind mode the spindle operation is in the reverse of that in the fast forward mode. Spindle means 44 is motor driven clockwise causing the grooves 90 in collars 48 and 52 to engage pins 72 and 74. Spindle means 42 is locked by locking pad 54. Due to the clockwise rotation, the grooves 88 in collars 46 and 50 disengage from pins 72 and 74 and rotate freely around the spindle 68. If the cassette machine is equipped for an autoreverse mode, eliminating the need to remove the cassette package 10 or a single cassette and turn it over, the operation of the spindle means 42 and 44 are automatically reversed to function in reverse of that just described in the play-record and rewind modes.

When two axially aligned but uninterlocked cassettes are assembled on spindle means 42 and 44 of the cassette machine 28, spindle means 42 and associated collars 46 and 50, and spindle means 44 and associated collars 48 and 52, will operate identically to that described above in the recording, reproduction, fast forward and rewind modes for an interlocked cassette package 10. However, since the respective supply and take-up reels are not interlocked the collars on each spindle 68 and 70 are free to rotate independently of one another.

When no motive force is applied to spindle shaft 70 collars 48, 52 will rotate clockwise due to the force exerted thereon by the biasing springs 80 and 82 resulting in engagement of the grooves 90 in collars 48, 52 with pins 72 and 74; collars 46, 50 will rotate counterclockwise due to the force exerted thereon by the biasing springs 80 and 82, resulting in engagement of the grooves 88 in collars 46, 50 with pins 72, and 74.

When the interlocked cassette package 10 is assembled on the spindle means 42 and 44, the respective collars may be depressed and rotated slightly due to the force exerted thereon by biasing springs 80 and 82 so that the ribs 86 of the collars will seat between adjacent sprockets 26 which are devoid of pins 24. When two axially aligned but uninterlocked cassettes are mounted on spindle means 42 and 44, the spindle means 42 and 44 operate identically.

It should be appreciated that the cassette system of the present invention can be used for multi-channel sound reproduction, specifically four channel, discrete sound reproduction is achieved by using conventional cassettes of standard dimension, tape width, and track width. Further, the machine 28 and cassette package 10 of the present invention enable information on one cassette to be accurately reproduced on another cassette; the cassette having the desired information is operated in the play mode and the remaining cassette of the package 10 is operated in the record mode.

It should be apparent to those skilled in the art that various modifications may be made in the present invention. The description is illustrative only and should not be construed to unduly limit the claims.

What is claimed is:

1. A multi-channel cassette system for sound recording and reproduction comprising:
- a first cassette including a supply reel, take-up reel and magnetic tape;
- a second cassette including a supply reel, take-up reel and magnetic tape said second cassette being positioned on said first cassette in a stacked relationship with the axes of said supply reels of said first and second cassettes aligned, and the axes of said take-up reels of said first and second cassettes, aligned;
- first means for interlocking said axially aligned supply reels of said first and second cassettes to synchronize the movement thereof;
- second means for interlocking said axially aligned take-up reels of said first and second cassettes to synchronize the movement thereof;
- each of said interlocking means including a central seating ring with a plurality of spaced pins connected to said central seating ring and extending transversely therefrom, said transverse pins being received between adjacent sprockets of said aligned supply reels and said aligned take-up reels;
- first spindle means for receiving said interlocked axially aligned supply reels;
- second spindle means for receiving said interlocked axially aligned take-up reels;
- magnetic transducer means for reproducing and recording information on said magnetic tapes of said first and second cassettes; and
- means for driving said magnetic tapes past said magnetic transducer means.

2. A multi-channel cassette system as claimed in claim 1 wherein:
- said first and second spindle means include pairs of upper and lower collars having longitudinal ribs thereon for positioning between adjacent sprockets of said aligned supply reels and said aligned take-up reels which are devoid of said pins.

3. A multi-channel cassette system for sound recording and reproduction on magnetic tapes comprising:
- first spindle means including a plurality of rotatable collars for receiving the supply reels of a plurality of cassettes, said first spindle means includes a shaft having a pair of collars concentrically mounted thereon, means for engaging said collars to cause said collars to rotate with said shaft when said shaft is rotated in one direction and to rotate freely about said shaft when said shaft is rotated in the opposite direction;
- second spindle means including a plurality of rotatable collars for receiving the take-up reels of a plurality of cassettes, said second spindle means includes a shaft having a pair of collars concentrically mounted thereon, means for engaging said collars to cause said collars to rotate with said shaft when said shaft is rotated in a direction opposite to the direction in which said collars rotate with said first spindle means and to rotate freely about said shaft when said second shaft is rotated in the opposite direction;

magnetic transducer means for reproducing and recording information on said plurality of cassettes; and means for driving the magnetic tapes past said magnetic transducer means.

4. A multi-channel cassette system for sound recording and reproduction on magnetic tapes comprising:

first spindle means including a plurality of rotatable collars for receiving the supply reels of a plurality of cassettes, said first spindle means includes a shaft with upper and lower cylindrical collars mounted thereon, said cylindrical collars having pin receiving grooves extending acutely downward from the top ends thereof, said shaft has two sets of pins arranged adjacent the top ends of said collars and extending outwardly therefrom, said sets of pins being in planes transverse to the longitudinal axis of said shaft, biasing means for biasing said collars upwardly to cause said pins to seat within said grooves, said grooves being arranged to receive said sets of pins when said collars are rotated in one direction and being arranged to disengage from said sets of pins when said collars are rotated in the opposite direction;

second spindle means including a plurality of rotatable collars for receiving the take-up reels of a plurality of cassettes, said second spindle means includes a shaft with upper and lower cylindrical collars mounted thereon, said cylindrical collars having pin receiving grooves extending acutely downward from the top ends thereof, said shaft has two sets of pins arranged adjacent the top ends of said collars and extending outwardly therefrom, said sets of pins being in planes transverse to the longitudinal axis of said shaft, biasing means for biasing said collars upwardly to cause said pins to seat within said grooves, said grooves being arranged to receive said sets of pins when said collars are rotated in a direction opposite to the direction in which the sets of pins receive said collars of said first spindle means and being arranged to disengage from said sets of pins when said collars are rotated in the opposite direction;

magnetic transducer means for reproducing and recording information on said plurality of cassettes; and means for driving the magnetic tapes past said magnetic transducer means.

* * * * *